Aug. 31, 1954  N. H. HACKETT  2,687,745
SAFETY SHUTOFF VALVE FOR FLUID PIPE LINES
Filed March 22, 1950
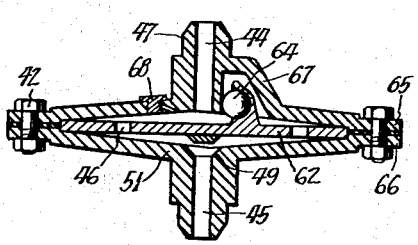
FIG_1_
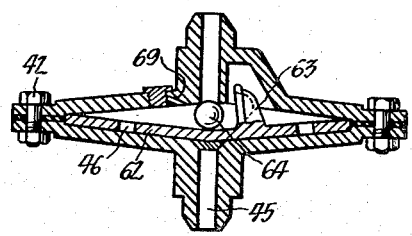
FIG_2_
Inventor
Norman Henry Hackett Patented Aug. 31, 1954

2,687,745

UNITED STATES PATENT OFFICE 2,687,745

SAFETY SHUTOFF VALVE FOR FLUID PIPE LINES

Norman Henry Hackett, Bondi, near Sydney, New South Wales, Australia

Application March 22, 1950, Serial No. 151,083

4 Claims. (Cl. 137—460)

This invention relates to a new and improved safety shut-off valve for incorporation in, or association with, fluid pipe lines such as hydraulic, pneumatic or similar pipe lines.

It is customary practice to provide fluid pipe lines to convey fluid under pressure for the purpose of operating mechanism such as the brakes of an automobile, the landing gear, flaps, air-brakes and other mechanisms of aircraft, and for many analogous purposes. In very many installations the one fluid system is required to operate two or more parts—as the brakes of all four wheels of an automobile, the port and starboard flaps of an aircraft, and so on. But if there occurs a fracture in a pipe leading to one of the parts to be operated then not only is that one part rendered inoperative but owing to the leakage of fluid through the fracture the fluid pressure is reduced so as to render the other parts which require to be worked also inoperative. Thus, if the hydraulic pipe line to the one wheel brake of an automobile be fractured then the other brakes of the automobile are also put out of commision, as well as the brake which is directly affected by the fracture in the pipe line.

It is known to provide devices which will operate to compensate for slow leakages of fluid at pipe line joints but such devices are relatively expensive to make and to install. Devices of this character customarily operate by displacement of fluid. One of the objects of this invention is to devise a safety shut-off valve, for incorporation in or association with fluid pipe lines, which will be adapted to operate so as to shut off the flow of fluid when there occurs a substantial pressure drop in the pipe line on one side of the safety shut-off valve—such as would be caused by the fracture of the pipe on that side.

A subsidiary object is to devise a valve which will be automatically operated when there occurs a pressure drop in a fluid pipe line. A further object is to provide a valve, of the type indicated, which will be economical to construct, easy to install and set in position, and efficient in operation.

With these and other objects in view I have devised a safety shut-off valve for a fluid pipe line (that is to say, a pipe line through which a desired fluid is adapted to flow) comprising a housing having a valve chamber formed with inlet and outlet openings for the passage of fluid therethrough and at least one valve member adapted to move towards one of those openings so as to shut off the flow of fluid when there occurs on one side of the valve member a pressure drop such as will create a differential of pressures on opposite sides of the valve member, the valve member being moved by that pressure differential. The valve member may consist of a valve head on a flexible diaphragm or a slide valve member or any other suitable valve closure means, and there may be provided means for adjusting the valve and/or for setting it in correct position.

In order that the invention will be clearly understood and readily put into practical effect reference will now be made to the accompanying drawing wherein there is depicted one possible construction of a safety shut-off device made according to this invention. In this drawing:

Figs. 1 and 2 depict the construction of a safety shut-off valve according to the invention, the two figures showing the valve in open and in closed position respectively.

In the drawings, wherein for the purpose of illustration is shown a preferred embodiment of my invention, diaphragm 62 has an integral cup or pocket 63 for the accommodation (when in open position) of a ball 64. The housing section 65 has an embossment 67 adapted to accommodate the cup or pocket 63 of the diaphragm 62, a tapped hole wherein is fitted a screw-threaded closure plug 68 and a relatively fine opening 69 extending from that tapped hole. The two housing sections 65 and 66 are fastened together by bolts 42 in such manner that the peripheral edge portion of the diaphragm 62 is clamped between them.

The diaphragm 62 is formed with openings 46 through which fluid may flow from the inlet opening 44 to the outlet opening 45 but it has only a single valve head member 51, formed with or attached to it. This valve head 51 is adapted to register with the valve seating 49 at the inner end of the outlet opening 45 when there occurs a pressure drop at the outlet side of the diaphragm 62, and when in that registering position the ball 64 is adapted to be located between the diaphragm 62 and the inner surface of the housing section 65 in such manner that it will prevent the return movement of the diaphragm 62. Thus the valve head 51 will be held in contact with the valve seating 49 so as to prevent the valve from re-opening until so required. The cup 63, which holds the ball 64 when the valve is open, ensures that said ball is withdrawn downwardly to its blocking position—see Fig. 2—when the diaphragm is flexed to its "off" position.

In order to re-open the valve it is merely necessary to unscrew the plug 68 and, by inserting a pin through the opening 69, to press the ball 64 into the pocket 63 so that it is clear of the inner surface of the housing section 65 at the inlet 44, thereby permitting the diaphragm to return to its normal or inoperative position.

The safety shut-off device according to this invention is adapted to be fitted into the fluid pipe line of any pressure fluid system, as the pneumatic system for operating controls of an aircraft, town gas supply mains, water mains, or the hydraulic brake system of a motor car, in order to close the pipe line in case of fracture at any position beyond the safety shut-off device. That is, the device is used to block off the supply of fluid to a pipe line which has been fractured and from which leakage is occurring.

The device according to the invention will operate only if there occurs a sudden pressure drop on the one side of the valve member and will not act to shut off the flow of fluid when there is a slow leakage. This appears to be a definite advantage arising from the invention as a slow leakage of fluid from a brake system, for example, will not render the system inoperative. That is to say, the device will operate only in cases where there is a leakage of such magnitude that the whole fluid system is endangered.

Having thus described the invention, what is claimed as new and desired to be secured by Letters Patent, is:

1. A self-closing valve comprising, in combination, a housing having an inlet and an outlet, being formed in the interior thereof with a free space located to one side of said inlet, and having next to said free space a surface portion directed toward said outlet; a flexible diaphragm extending across the interior of said housing between said inlet and outlet thereof and being formed with at least one opening so that fluid may flow through said opening from said inlet to said outlet of said housing; a valve seat formed in said housing at said outlet thereof and facing one side of said diaphragm; a projecting portion located at said one side of said diaphragm opposite said valve seat for engaging the latter to close said outlet when said diaphragm moves toward said outlet upon a drop in pressure at the latter; a carrier portion fixed to a side of said diaphragm opposite said one side thereof and extending at least partly into said free space of said housing, said carrier portion being located to one side of said surface portion of said housing; and a holding member releasably held by said carrier portion between the latter and a part of said housing and at least partly in said free space of said housing, so that when said diaphragm moves toward said outlet said carrier portion moves therewith to carry said holding member to a position between said surface portion of said housing and said diaphragm to prevent movement of the latter back toward said inlet so as to maintain said projecting portion on said valve seat.

2. A self-closing valve comprising, in combination, a housing having an inlet and an outlet, being formed in the interior thereof with a free space located to one side of said inlet, being formed with an aperture on an opposite side of said inlet from said free space, and having next to said free space a surface portion directed toward said outlet; a flexible diaphragm extending across the interior of said housing between said inlet and outlet thereof and being formed with at least one opening so that fluid may flow through said opening from said inlet to said outlet of said housing; a valve seat formed in said housing at said outlet thereof and facing one side of said diaphragm; a projecting portion located at said one side of said diaphragm opposite said valve seat for engaging the latter to close said outlet when said diaphragm moves toward said outlet upon a drop in pressure at the latter; a carrier portion fixed to a side of said diaphragm opposite said one side thereof and extending at least partly into said free space of said housing, said carrier portion being located to one side of said surface portion of said housing; a holding member releasably held by said carrier portion between the latter and a part of said housing and at least partly in said free space of said housing, so that when said diaphragm moves toward said outlet said carrier portion moves therewith to carry said holding member to a position between said surface portion of said housing and said diaphragm to prevent movement of the latter back toward said inlet so as to maintain said projecting portion on said valve seat; and plug means removably located in and closing said aperture of said housing, so that when said plug means is removed an implement may be inserted into said housing through said aperture to move said holding member back to a position between said side of said carrier portion and said part of said housing in said free space thereof to free said diaphragm for movement back toward said outlet.

3. A self-closing valve comprising, in combination, a housing having an inlet and an outlet, being formed with a free space located to one side of said inlet, having next to said free space a surface portion directed toward said outlet, and having a wall portion substantially normal to said surface portion and defining that part of said free space which is located nearest to said outlet; a diaphragm extending across the interior of said housing between said inlet and outlet thereof and being formed with at least one opening through which fluid flows from said inlet to said outlet of said housing; a valve seat formed in said housing at said outlet thereof and facing one side of said diaphragm; a valve member fixed to said one side of said diaphragm opposite said valve seat for engaging the latter upon movement of said diaphragm toward said outlet when the pressure drops at the latter; a carrier fixed to said diaphragm, extending at least partly into said free space of said housing, and being formed with a recess facing said wall portion of said housing; and a holding member located in said recess and against said wall portion of said housing so that when said diaphragm moves toward said outlet said carrier moves said holding member along said wall portion to a position between said surface portion of said housing and said diaphragm to prevent the latter from moving back toward said inlet so as to maintain said valve member in engagement with said valve seat for closing said outlet.

4. A self-closing valve comprising, in combination, a housing having an inlet and an outlet, being formed with a free space located to one side of said inlet, having next to said free space a surface portion directed toward said outlet, and having a wall portion substantially normal to said surface portion and defining that part of said free space which is located nearest to said outlet; a diaphragm extending across the interior of said housing between said inlet and outlet thereof and being formed with at least one opening through which fluid flows from said inlet to said outlet of said housing; a valve seat formed in said housing at said outlet thereof and facing one side of said diaphragm; a valve member fixed to said one side of said diaphragm opposite said valve seat for engaging the latter upon movement of said diaphragm toward said outlet when the pressure drops at the latter; a carrier fixed to said diaphragm, extending at least partly into said free space of said housing, and being formed with a concave recess facing said wall portion of said housing; and a ball member located in said recess and against said wall portion of said housing so that when said diaphragm moves toward said outlet said carrier moves said ball member along said wall portion to a position between said surface portion of said housing and said diaphragm to prevent the latter from moving back toward said inlet so as to maintain said valve member in engagement with said valve seat for closing said outlet.

References Cited in the file of this patent

UNITED STATES PATENTS

| Number | Name | Date |
|---|---|---|
| 756,624 | Gschwind | Apr. 5, 1904 |
| 1,767,201 | Boynton | June 24, 1930 |
| 1,845,139 | Exley | Feb. 16, 1932 |
| 1,983,791 | Carver | Dec. 11, 1934 |
| 2,040,580 | Vorech | May 12, 1936 |
| 2,055,182 | Schultz | Sept. 22, 1936 |
| 2,127,849 | Stone | Aug. 23, 1938 |
| 2,361,963 | Rosenblatt | Nov. 7, 1944 |
| 2,465,606 | Reynolds | Mar. 29, 1949 |
| 2,466,441 | Keller | Apr. 5, 1949 |

FOREIGN PATENTS

| Number | Country | Date |
|---|---|---|
| 757,593 | France | Dec. 28, 1933 |